(No Model.)

S. L. CLEMENS.
GAME APPARATUS.

No. 324,535. Patented Aug. 18, 1885.

WITNESSES:
Theo. G. Hoster
E. Sedgwick

INVENTOR:
S. L. Clemens
BY Munn & Co
ATTORNEYS.

UNITED STATES PATENT OFFICE.

SAMUEL L. CLEMENS, OF HARTFORD, CONNECTICUT.

GAME APPARATUS.

SPECIFICATION forming part of Letters Patent No. 324,535, dated August 18, 1885.

Application filed October 9, 1884. (No model.)

*To all whom it may concern:*

Be it known that I, SAMUEL L. CLEMENS, of Hartford, in the county of Hartford and State of Connecticut, have invented a new and Improved Game Apparatus, of which the following is a full, clear, and exact description.

The object of my invention is to provide a new and improved instructive and amusing game.

The invention consists in a player's chart provided with a series of rows or columns of numbers, a hole being provided under or at each number, and a number of holes being provided at the end of each row or column.

The invention also consists in an umpire's chart provided with rows of numbers, columns, or rows for the names of the corresponding ruler, and with rows or columns for the special event of each year.

Reference is to be had to the accompanying drawings, forming part of this specification, in which similar letters of reference indicate corresponding parts in both the figures.

Figure 1:
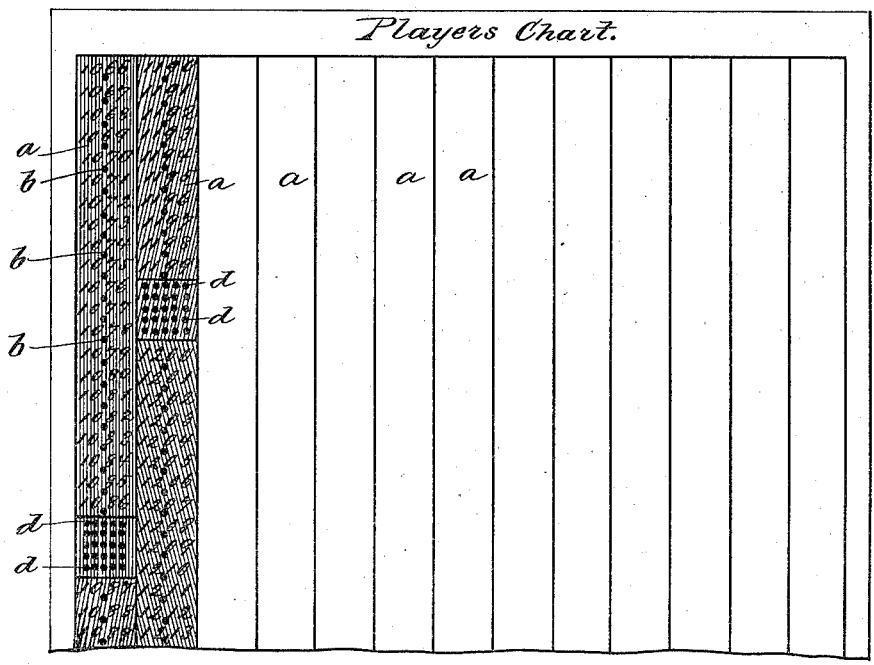
Figure 2:
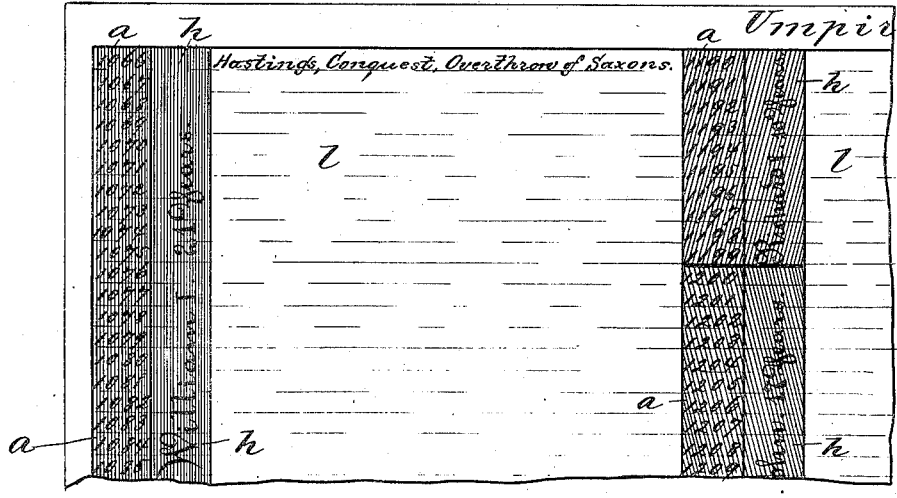

Figure 1 is a face view of part of the player's chart. Fig. 2 is a face view of part of the umpire's chart.

To play the game an umpire is recommended, and one or several players are required, each player preferably having a chart, A, and the umpire a chart, B. Each chart A is provided with a series of vertical or horizontal rows or columns, *a*, of different colors and varying lengths, each column containing the numbers of the successive years of the reigns of monarchs, presidents, consuls, and other rulers. Each ruler has a separate column or row which is longer or shorter according to the duration of the reign of the said ruler. Under the numbers of each year a small hole, *b*, is provided for receiving a pin or peg, and under each column, or at the end of each row, twenty-five small holes, *d*, are arranged in rows of five each. As the columns or rows have different colors, they can be distinguished from each other very readily. The columns may contain the numbers of the years comprised in the reigns of antiquity, the middle ages, or modern times, each on a separate chart, or the several columns of the reigns of different ages may all be produced on the same chart.

The chart may contain the number of years of the reigns of rulers in any country. As shown, the columns begin with the reign of William I of England, the conqueror, who reigned twenty-one years, and consequently the column contains the numbers of the years from 1066 to 1087. The second column contains the numbers of years during the reign of William II, who reigned thirteen years, and consequently this column contains the numerals from 1087 to 1100, and so on. No names or other information of any kind whatever are printed on the player's chart A.

The umpire's chart B is also provided with number-columns *a*, the same as the chart A; but adjacent to each column *a* a space, *h*, for the names of the monarchs, presidents, consuls, or other rulers, and at the side of the said space *h* a larger space or column, *l*, is provided on which are printed the principal events of each year in line with the year-numbers, the said events relating to the country of the ruler or to any other country. For instance, beginning with the first column and the year 1066, we have the battle of Hastings and overthrow of the Saxons, and so on. All the players play on the same kind of chart, but each may have an umpire's chart for study before playing the game.

The game is played in the following manner: The first player takes a pin and states that he will place it in the hole of a certain year, and at the same time he states an event of that year. If his statement is correct, he places the pin in the corresponding hole, and if his statement is not correct he is not permitted to place the pin in the hole. The umpire decides whether the statement made is correct or not. In this manner the game is played until one player has placed a certain stipulated number of pins in the holes of his chart. This number may vary according to the experience of the players, for players having an extended knowledge of history will require a greater number of pins to be placed in the holes in the chart than beginners.

I do not limit myself to the arrangement of the charts shown, but may arrange them in various other ways.

In place of arranging the holes under each number, they may be arranged in separate columns at the sides of the columns *a*.

The twenty-five or more or less holes $d$ at the bases of the columns are to receive pins to be used for miscellaneous occurrences.

It is not intended to embrace in this application the game-board invented and patented by Victor Klobassa, dated March 6, 1875, having upon its face two concentric circles with radial lines between them, forming one hundred spaces, in which are marked in succession the years from 1776 downward, with a notable event for each year marked in the proper space, which game is played by numbered balls or dice, as described, and which is not my invention.

Having thus described my invention, what I claim as new, and desire to secure by Letters Patent, is—

1. A game-chart provided with columns or rows of numbers, a hole being produced at each number, and a series of rows of five holes each being formed at the end of each row, substantially as herein shown and described.

2. A game-chart provided with rows or columns of numbers and of columns or rows adjacent to the number columns or rows, on which additional rows or columns the names of the rulers corresponding with the number columns or rows are designated, substantially as herein shown and described.

3. A game-chart provided with rows or columns of numbers, rows or columns containing the names of rulers who reigned during the times comprised by the numbers, and rows or columns containing certain events of each year, substantially as herein shown and described.

SAMUEL L. CLEMENS.

Witnesses:
ALBERT H. OLMSTED,
GEO. H. BURT.